United States Patent
Kamiya

(10) Patent No.: US 9,825,502 B2
(45) Date of Patent: Nov. 21, 2017

(54) ELECTRIC MOTOR HAVING AIR PURGE FUNCTION

(71) Applicant: FANUC CORPORATION, Yamanashi (JP)

(72) Inventor: Youhei Kamiya, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 268 days.

(21) Appl. No.: 14/717,483

(22) Filed: May 20, 2015

(65) Prior Publication Data

US 2015/0340922 A1 Nov. 26, 2015

(30) Foreign Application Priority Data

May 22, 2014 (JP) ................................ 2014-106058

(51) Int. Cl.
*H02K 5/10* (2006.01)
*H02K 9/00* (2006.01)
*H02K 5/173* (2006.01)
*H02K 9/02* (2006.01)

(52) U.S. Cl.
CPC ............ *H02K 5/10* (2013.01); *H02K 5/1732* (2013.01); *H02K 9/00* (2013.01); *H02K 9/02* (2013.01)

(58) Field of Classification Search
CPC ........................................................ H02K 5/10
USPC ............................................................ 310/88
See application file for complete search history.

(56) References Cited

U.S. PATENT DOCUMENTS

| 5,424,600 | A | * | 6/1995 | Ishikawa | H02K 5/136 310/220 |
|---|---|---|---|---|---|
| 5,753,986 | A | * | 5/1998 | Ohtani | H02K 5/136 310/52 |
| 7,459,817 | B2 | * | 12/2008 | VanLuik | H02K 1/32 310/216.004 |
| 2004/0027011 | A1 | * | 2/2004 | Bostwick | H02K 5/10 310/58 |

(Continued)

FOREIGN PATENT DOCUMENTS

| JP | S58090053 U | 6/1983 |
|---|---|---|
| JP | S63088051 U | 6/1988 |
| JP | H01133538 A | 5/1989 |

(Continued)

OTHER PUBLICATIONS

English Translation for Japanese Publication No. 2013236473, published Nov. 21, 2013, 17 pages.

(Continued)

*Primary Examiner* — Jeremy Luks
(74) *Attorney, Agent, or Firm* — Fredrikson & Byron, P.A.

(57) ABSTRACT

An electric motor includes a rotor which is rotatably supported by a first bearing which is provided at a first end part on an output shaft side and a second bearing which is provided at a second end part opposite to the first end part, a stator which is provided with a winding and which surrounds the rotor, a front housing part which supports the first bearing and which forms a winding accommodation space which accommodates the winding, a rear housing part which supports the second bearing, an air feed port to which pressurized air is fed, and an air flow path which linearly extends from said air feed port to a space surrounding the first bearing and communicates with the winding accommodation space.

5 Claims, 3 Drawing Sheets

(56) References Cited

U.S. PATENT DOCUMENTS

2013/0300230 A1* 11/2013 Nakazawa ............... H02K 5/10
                                                      310/63
2014/0364263 A1* 12/2014 Tokunaga ............. F16C 35/063
                                                      475/149

FOREIGN PATENT DOCUMENTS

| JP | 2007105850 A | 4/2007 |
|----|--------------|--------|
| JP | 2013236473 A | 11/2013 |

OTHER PUBLICATIONS

English Translation for Japanese Publication No. 2007105850, published Apr. 26, 2007, 17 pages.
English Translation for Abstract of Japanese Publication No. H01133538, published May 25, 1989, 1 page.
Untranslated Office Action for JP Application No. 2014-106058, dated Sep. 8, 2015, 2 pages.
Partial Translation of Office Action for JP Application No. 2014-106058, dated Sep. 8, 2015, 2 pages.
English Abstract for Japanese Publication No. 2007-105850 published Apr. 27, 2007, 1 pg.
English Abstract for Japanese Publication No. 2013-236473 published Nov. 21, 2013, 1 pg.

* cited by examiner

ELECTRIC MOTOR HAVING AIR PURGE FUNCTION

BACKGROUND OF THE INVENTION

1. Field of the Invention

The present invention relates to an electric motor which has an air purge function for preventing the entry of foreign matter to the inside of the electric motor.

2. Description of the Related Art

An electric motor which drives a machine tool is sometimes used in an environment where cleaning fluid, cutting fluid, etc. are sprayed. To prevent cleaning fluid, cutting fluid, or other foreign matter from entering inside the electric motor, it is known to provide a seal member at joined parts of members which form the housing or to provide an oil seal between the housing and shaft. However, for example, in the case of an electric motor which operates at a high speed such as over 8000 rpm, the oil seal may become worn and cannot provide the desired sealing effect.

Known in the art is an electric motor which has an air purge function for preventing the entry of foreign matter to the inside of the electric motor without using an oil seal. For example, known in the art is a spindle device of a machine tool which is designed to introduce compressed air to the inside of an electric motor through a tube which is attached to an input shaft side and to discharge compressed air through the air gap between the stator core and rotor from the opposite output shaft side to the outside of the electric motor (see JP2007-105850A).

Further, known in the art is an electric motor which is provided with an air purge device attached to an end face at an output shaft side and having an air flow path which extends straight toward the inside in the radial direction (see JP2013-236473A).

However, when feeding compressed air from the opposite input shaft side to the output shaft side, the flow path of the compressed air tends to be long, and therefore the pressure loss increases. Further, since the air gap between the stator core and the rotor is generally small, the pressure loss may be even greater. For this reason, the efficiency of utilization of air tends to be low and a large amount of air has to be fed to provide the air purge function. Further, since a bent air flow path has to be formed, the structure becomes complicated and the production cost increases.

In the case where an air feed port is provided at the output shaft side and compressed air is fed through a straight flow path as disclosed in JP2013-236473A, the rate of feed of air becomes excessive at the time of acceleration or at the time of steady operation of the electric motor and the efficiency drops. Further, when the supply of air becomes unstable and the amount of air temporarily becomes insufficient, entry of foreign matter to a portion near the output shaft may not be able to be prevented.

Therefore, there is a need for an electric motor which has an air purge function with improved efficiency of utilization of air.

SUMMARY OF THE INVENTION

According to a first aspect of the present application, there is provided an electric motor comprising: a rotor which is rotatably supported by a first bearing which is provided at a first end part on an output shaft side and a second bearing which is provided at a second end part opposite to said first end part; a stator which is provided with a winding and which surrounds said rotor; a front housing part which supports said first bearing and which forms a winding accommodation space which accommodates said winding; a rear housing part which supports said second bearing; an air feed port to which pressurized air is fed; and an air flow path which linearly extends from said air feed port to a space surrounding said first bearing and communicates with said winding accommodation space.

According to a second aspect of the present application, there is provided the electric motor according to the first aspect wherein said air flow path extends in a direction perpendicular to a rotational axis of said rotor.

According to a third aspect of the present application, there is provided the electric motor according to the first or second aspect wherein said winding accommodation space communicates with a space around said second bearing.

According to a fourth aspect of the present application, there is provided the electric motor according to any one of the first to third aspects further comprising an additional air feed port, separate from said air feed port, at said second end part.

According to a fifth aspect of the present application, there is provided the electric motor according to any one of the first to fourth aspects wherein a terminal end of said winding accommodation space on a side of said first end part is provided at a position beyond said first bearing.

These and other objects, features and advantages of the present invention will become more apparent in light of the detailed description of exemplary embodiments thereof as illustrated in the drawings.

DETAILED DESCRIPTION OF THE INVENTION

Figure 1:
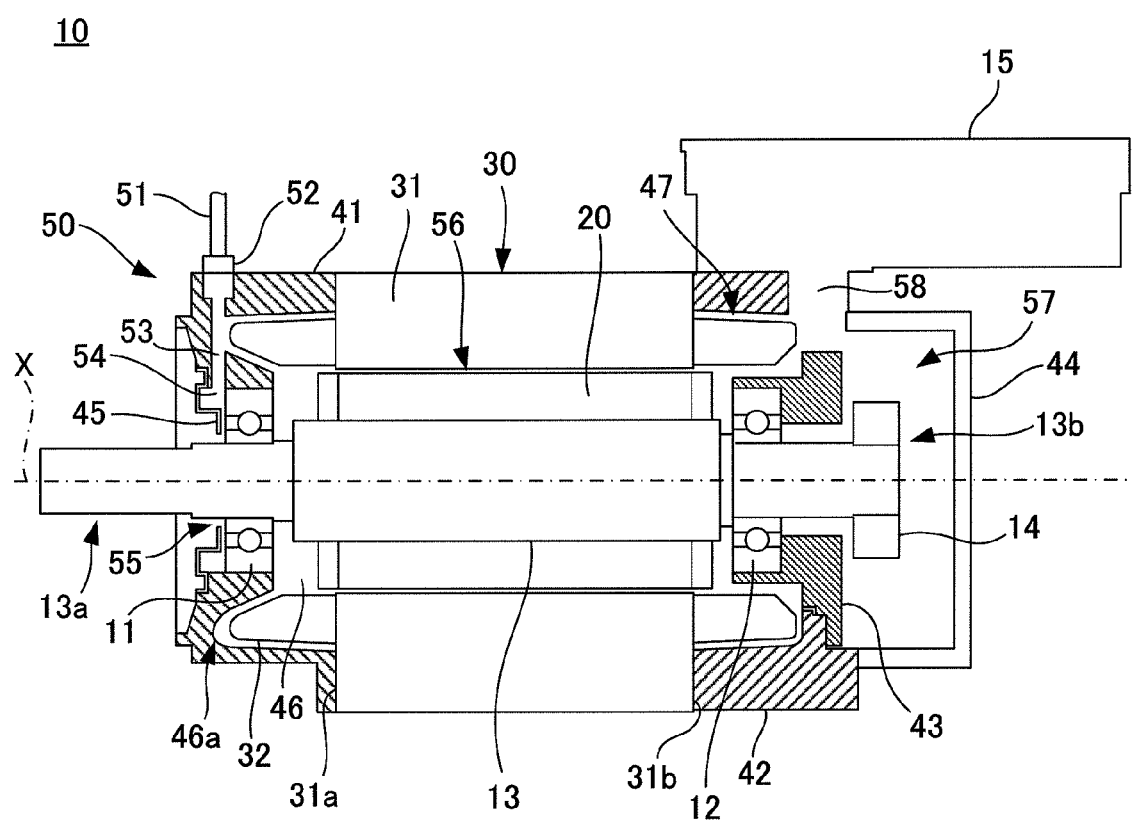
FIG. 1 is a longitudinal cross-sectional view which schematically shows an electric motor according to a first embodiment.

Embodiments of the present invention will be described with reference to the accompanying Drawings. Constituent elements of the illustrated embodiments are changed in size as necessary to facilitate understanding of the present invention. For identical or corresponding constituent elements, the same reference numerals are used throughout a plurality of embodiments.

Figure 2:
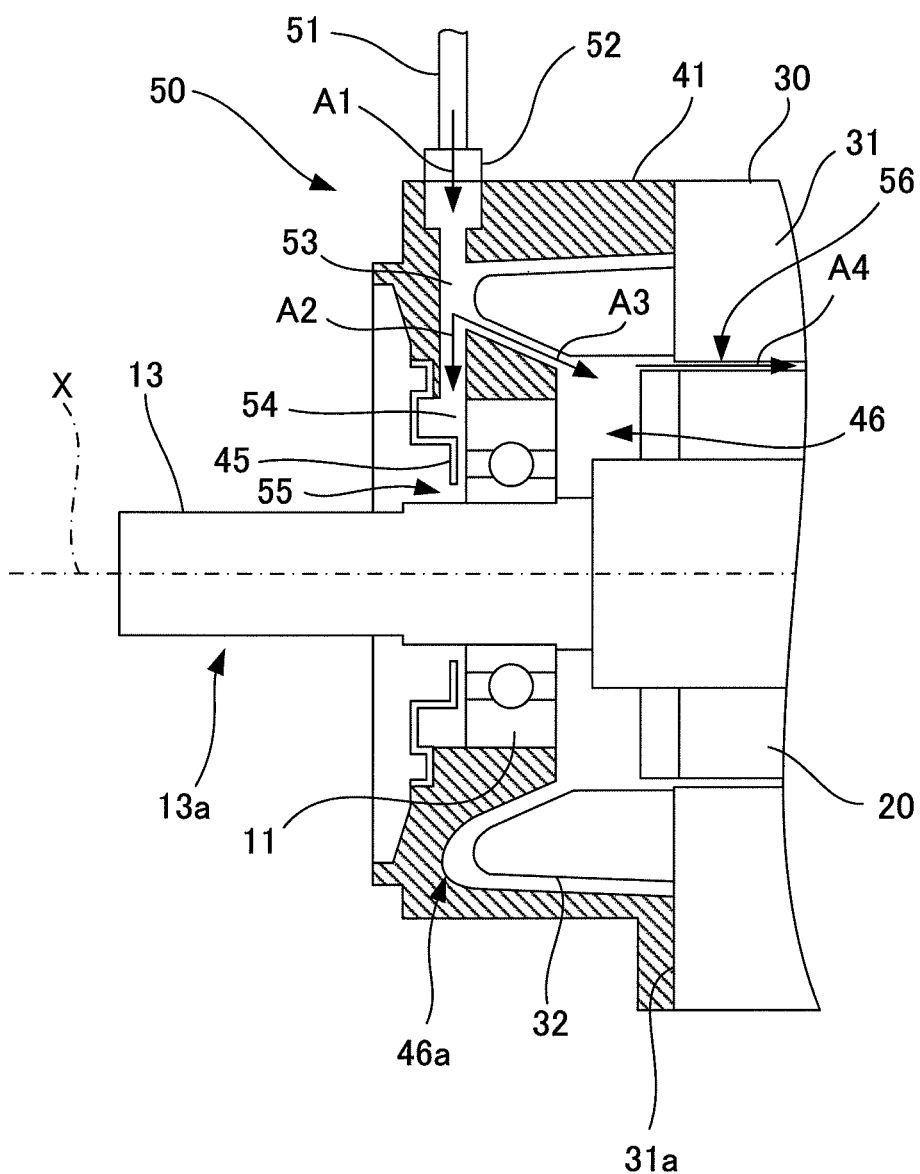
FIG. 2 is a partial enlarged view which shows a vicinity of an output shaft of the electric motor of FIG. 1.

Referring to FIG. 1 and FIG. 2, a first embodiment will be explained. FIG. 1 is a longitudinal cross-sectional view which schematically shows an electric motor 10 according to the first embodiment. FIG. 2 is a partial enlarged view which shows a vicinity of an output shaft of the electric motor 10 of FIG. 1. The electric motor 10 is provided with a shaft 13 which is supported to be able to rotate about a rotational axis line X by a first bearing 11 and a second bearing 12, a rotor 20 which fits over an outer circumferential surface of the shaft 13 and rotates together with the shaft 13, and a roughly cylindrical shaped stator 30 which extends along the rotational axis line X so as to surround the rotor 20.

The first bearing 11 is arranged near a front end 13a of the shaft 13. The first bearing 11 is, for example, supported by a front housing part 41 which is screwed to a front end face 31a of a stator core 31. The front housing part 41 extends from the front end face 31a of the stator core 31 toward the front end 13a of the shaft 13 and surrounds part of the shaft 13 and the first bearing 11. Further, the front housing part 41 includes a roughly ring shaped front cover 45 attached thereto. The front end 13a of the shaft 13 sticks out from the front housing part 41 and front cover 45. For example, the shaft 13 acts as an output shaft which is directly or indirectly coupled with a spindle of a machine tool. For convenience, the output shaft side will be referred to as "front" and the opposite non-output shaft side will be referred to as "rear" in the present specification.

The second bearing 12 is positioned near a rear end 13b of the shaft 13 which is positioned at an opposite side from the front end 13a. The second bearing 12 is surrounded by a rear housing part 42 which is screwed to a rear end face 31b of the stator core 31 and by a support ring 43 which is screwed to the rear housing part 42. The second bearing 12 is supported by the support ring 43. The rear end 13b of the shaft 13 which sticks out from the rear housing part 42 is surrounded by a rear cover 44 which is attached to the rear housing part 42. At the rear end 13b of the shaft 13, an encoder 14 which detects a rotational position, rotational speed of the shaft 13 or the like is provided.

The stator 30 includes a stator core 31 which is formed from a large number of stacked electromagnetic steel sheets and a winding 32 which is wound around projecting parts (not shown) which are formed on the inner circumferential surface of the stator core 31. The winding 32 is fixed to the stator core 31 by a resin or the like. The winding 32 extends along the rotational axis line X so as to stick out from the two ends of the stator core 31. Lead wires (not shown) which extend out from a terminal box 15 are connected to the winding 32. The winding 32 generates a rotating magnetic field as an electric current is supplied through the lead wires. The rotor 20 is designed to rotate together with the shaft 13 in accordance with the rotating magnetic field which is generated by the stator 30.

The parts of the winding 32 which stick out from the stator core 31 are surrounded by the front housing part 41 and the rear housing part 42. In the present specification, an internal space which is formed by the housing of the electric motor 10 surrounding the winding 32 (front housing part 41 or rear housing part 42) is referred to as the "winding accommodation space". In the illustrated embodiment, the winding accommodation spaces 46 and 47 are formed around the winding 32 by the front housing part 41 and the rear housing part 42, respectively.

An electric motor coupled to a spindle of a machine tool is used in an environment in which cleaning fluid, cutting fluid or the like (hereinafter simply referred to as "foreign matter") is sprayed. If this foreign matter enters the inside of the electric motor, the winding may be subjected to insulation failure or the supporting effect by the bearings may be decreased. Therefore, the entry of foreign matter has to be prevented. A known configuration includes a labyrinth seal, oil seal or the like. However, a labyrinth seal does not provide sufficient sealing effect, and an oil seal cannot be applied to an operation at high speed rotation.

Therefore, the electric motor 10 according to the present embodiment is provided with an air feed part 50 near the front end 13a of the shaft 13. The air feed part 50 feeds pressurized air from an air chamber, which is not shown, to the space surrounding the first bearing 11. Further, by continuously discharging the air from the front end 13a of the shaft 13 to outside of the electric motor 10, it is possible to prevent foreign matter from entering the inside of the electric motor 10.

As illustrated, the air feed part 50 includes an air feed port 52 to which a tube 51 in communication with an air chamber is attached, an air flow path 53 which extends through the inside of the front housing part 41, and an air discharge path 54. The air flow path 53 is, for example, formed in the front housing part 41 by machining.

The air flow path 53 is formed by a through hole which passes through the front housing part 41 in the radial direction. The air flow path 53 linearly extends from the air feed port 52 toward the inside in the radial direction. In one embodiment, the air flow path 53 extends in a direction perpendicular to the rotational axis line X of the rotor 20.

The air discharge path 54 is delimited by the front cover 45 and is positioned at the terminal end of the air flow path 53. The front cover 45, as illustrated, sticks out toward the shaft 13 to the inside in the radial direction and forms a gap 55 with the outer circumferential surface of the shaft 13. Due to this, air which is fed from the air feed part 50 passes through the air discharge path 54 and gap 55 and is discharged to outside of the electric motor 10.

According to the present embodiment, the air flow path 53 communicates with the winding accommodation space 46 which accommodates the winding 32 of the stator 30. As shown in FIG. 2, the air flow path 53 and the winding accommodation space 46 are communicated with each other at a terminal end 46a of the front of the winding accommodation space 46. In one embodiment, the terminal end 46a of the front of the winding accommodation space 46 is provided at a position beyond the first bearing 11. In other words, the terminal end 46a of the winding accommodation space 46 is positioned on an extension of the air flow path 53.

The winding accommodation space 46 communicates with the winding accommodation space 47 at the rear side which is formed by the rear housing part 42 through a communicating part 56 which is formed by the gap between the stator core 31 and the rotor 20. Further, the rear side winding accommodation space 47 communicates with the internal space 57 which is surrounded by the rear housing part 42 and the rear cover 44. The rear side internal space 57 also communicates with the inside of the terminal box 15 through the communicating part 58.

Next, the air purge function of the electric motor 10 according to the present embodiment will be explained. When the electric motor rotates at high speed, such as 8000 rpm, or in particular, over 20,000 rpm, a relatively large centrifugal force is generated, so foreign matter or air near the shaft is discharged to the outside of the electric motor. At the same time, a negative pressure is generated near the shaft, but due to the discharge effect caused by the centrifugal force, even a small amount of air is enough to prevent foreign matter from entering inside the electric motor during the high speed operation of the electric motor. Further, when the electric motor is not operating, pressure in the vicinity of the output shaft is generally equal to atmospheric pressure and no pressure difference occurs between the inside and outside of the electric motor. For this reason, there is no effect of sucking in foreign matter near the output shaft, and therefore even a small amount of air is enough to prevent the entry of foreign matter in this case as well.

On the other hand, at the time of deceleration of the electric motor, the centrifugal force falls, generating an effect of sucking foreign matter due to the influence of the negative pressure which is generated near the output shaft at the time of high speed rotation. For this reason, in order to prevent the entry of foreign matter at the time of deceleration of the electric motor, it is necessary to feed a larger amount of air compared with the time of stopping and the time of steady operation.

In the electric motor 10 according to the present embodiment, the air which is fed from the air feed port 52, as shown by the arrow mark A1 in FIG. 2, is introduced into the straight air flow path 53. The air which flows through the air flow path 53, as shown by the arrow mark A2, passes through the air discharge path 54 and the gap 55 and is discharged to the outside of the electric motor 10.

As explained above, the air flow path 53 communicates with the winding accommodation space 46. Therefore, part of the flow of air which passes through the air flow path 53, as shown by the arrow mark A3, flows into the winding accommodation space 46. The air is stored in the winding accommodation space 46, and part of the air, as shown by the arrow mark A4, passes through the communicating part 56 and flows toward the rear side internal space 57.

According to the present embodiment, air which is stored in the winding accommodation space 46 is used to compensate the insufficient amount of air when the amount of air to be supplied to the space around the shaft 13 and the first bearing 11 becomes temporarily insufficient. Further, in one embodiment, the communicating part of the air flow path 53 and the winding accommodation space 46 is provided at a position closer to the air discharge path 54 than the air feed port 52, preferably near the air discharge path 54. By providing the winding accommodation space 46 and the air discharge path 54 close to each other, air for compensating the shortages is efficiently supplied from the winding accommodation space 46.

The electric motor 10 according to the present embodiment has the following advantages:

(1) Since the air flow path 53 is communicated with the winding accommodation space 46, the high pressure air is stored in the winding accommodation space 46 during steady operation of the electric motor 10. This allows the insufficient amount of air to be supplemented by the air from the winding accommodation space 46, when the electric motor 10 decelerates and a large amount of air is temporarily needed. Accordingly, it is no longer necessary to supply a large amount of air in case the electric motor 10 decelerates, and the feed rate of air can be lowered.

(2) Even if the feed rate of air from the air feed part 50 is unstable and the feed rate of air temporarily becomes less than the required amount, the insufficient amount of air can be supplemented by the air which is stored in the winding accommodation space 46. As a result, a stable air purge function can be provided.

(3) The air feed part 50 is provided near the front end 13a (output shaft side). This allows air to be supplied preferentially to the front end of the shaft where foreign matter tends to enter easily. In addition, since air is also supplied through the winding accommodation space 46 to the rear end (non-output shaft side), an air purge function can be realized for the entire electric motor 10.

(4) The air flow path 53 has a straight shape, so for example a relatively simple machining operation may be used to form the air flow path 53 at the front housing part 41 and the production cost can be slashed.

(5) The terminal end 46a of the front side of the winding accommodation space 46 is formed at a position beyond the first bearing 11. This allows the air flow path 53 and the winding accommodation space 46 to be easily communicated with each other. Specifically, since the terminal end part 46a of the winding accommodation space 46 is positioned on the extension of the air flow path 53 when the air flow path 53 is formed, the air flow path 53 and the winding accommodation space 46 are communicated with each other without requiring an additional process.

Figure 3:
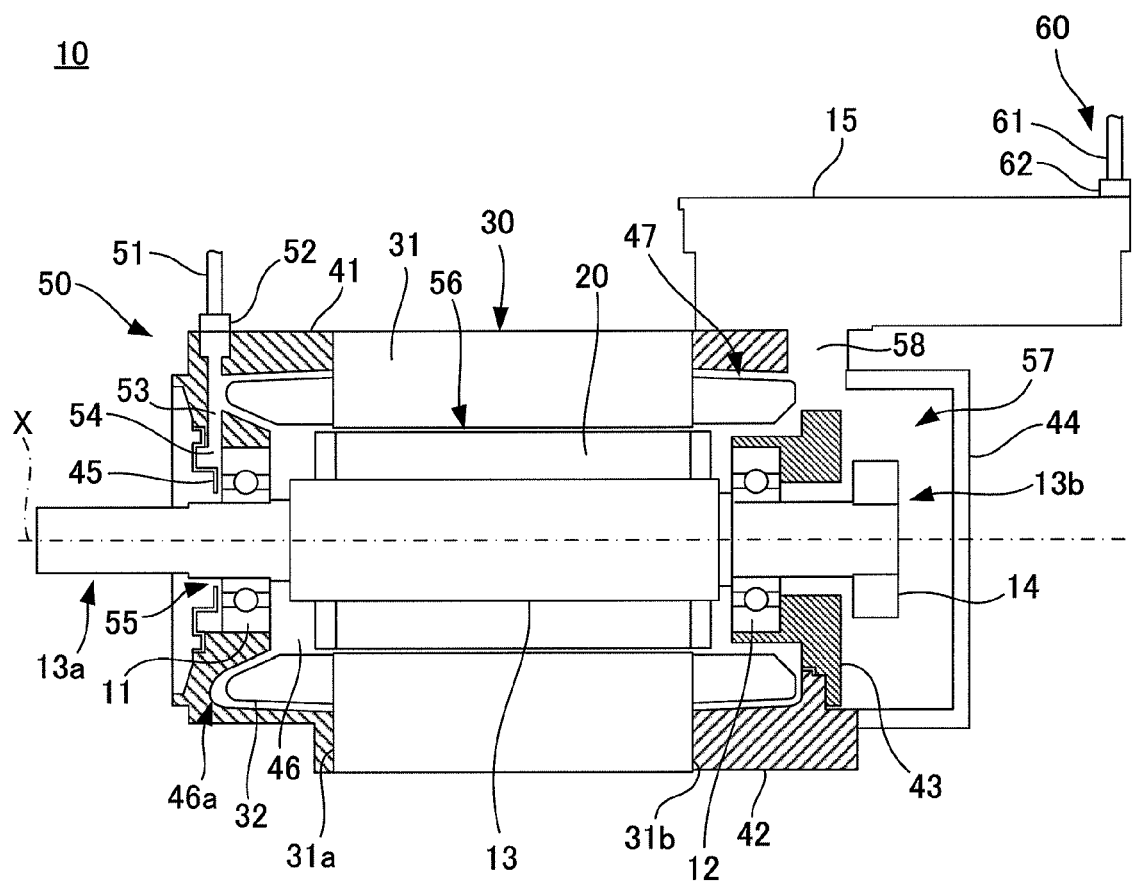
FIG. 3 is a longitudinal cross-sectional view which schematically shows an electric motor according to a second embodiment.

FIG. 3 is a longitudinal cross-sectional view which schematically shows an electric motor 10 according to a second embodiment. The electric motor 10 according to the present embodiment differs from the first embodiment in that in addition to the air feed part 50 which is provided at the front end 13a side, an additional air feed part (hereinafter referred to as the "second air feed part 60") is provided at the opposite rear end 13b side.

As shown in FIG. 3, the second air feed part 60 includes a tube 61 which connects an air chamber (not shown) and the second air feed part 60, and an air feed port 62 which is formed at the top surface of the terminal box 15. The air which is fed through the second air feed port 62 flows through the inside of the terminal box 15 and the internal space 57 which is surrounded by the rear housing part 42 and rear cover 44. In this way, the air which is fed by the second air feed part 60 can independently provide an air purge function for the rear side of the electric motor 10.

According to the electric motor 10 of the present embodiment, compared with the case of feeding air from the front side, the pressure loss can be reduced. Therefore, in addition to the advantages which were explained in relation to the first embodiment, there is an additional advantage in that it is possible to provide a sufficient air purge function even with a relatively low air pressure.

EFFECT OF THE INVENTION

According to the electric motor having the above configuration, the air flow path is communicated with the winding accommodation space, and therefore high pressure air is stored in the winding accommodation space at the time of acceleration and steady operation of the electric motor. Due to this, even if the air which is required for the air purge function is temporarily insufficient, the air which is stored in the winding accommodation space is supplied to the air flow path and supplements the shortage of air. Due to this, the efficiency of utilization of air is improved and the feed rate of air can be decreased.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

The invention claimed is:

1. An electric motor comprising:
   a rotor which is rotatably supported by a first bearing which is provided at a first end part on an output shaft side and a second bearing which is provided at a second end part opposite to said first end part;
   a stator which is provided with a winding and which surrounds said rotor;
   a front housing part which supports said first bearing and which forms a winding accommodation space which accommodates said winding; and
   a rear housing part which supports said second bearing;

wherein the front housing part further comprises an air feed port to which pressurized air is fed; and an air flow path which linearly extends from said air feed port through an inside of the front housing part to a space surrounding said first bearing and communicates with a terminal end of a front of said winding accommodation space.

2. The electric motor according to claim 1 wherein said air flow path extends in a direction perpendicular to a rotational axis of said rotor.

3. The electric motor according to claim 1 wherein said winding accommodation space communicates with a space around said second bearing.

4. The electric motor according to claim 1 further comprising an additional air feed port, separate from said air feed port, at said second end part.

5. The electric motor according to claim 1 wherein the terminal end of the front of said winding accommodation space on a side of said first end part is provided at a position beyond said first bearing.

* * * * *